United States Patent
VanHyfte et al.

(10) Patent No.: US 9,937,659 B2
(45) Date of Patent: Apr. 10, 2018

(54) ULTRASONIC EDGE SEALING OF SHEET MOLDING COMPOUND CARRIER FILM

(71) Applicant: Magna International Inc., Aurora, CO (US)

(72) Inventors: Terry VanHyfte, Fort Wayne, IN (US); Phil Holjak, Cornelius, NC (US); Roy Potter, Woodburn, IN (US); Randy Stilwell, Grabill, IN (US)

(73) Assignee: Magna International Inc., Aurora (CA)

( * ) Notice: Subject to any disclaimer, the term of this patent is extended or adjusted under 35 U.S.C. 154(b) by 152 days.

(21) Appl. No.: 14/699,738

(22) Filed: Apr. 29, 2015

(65) Prior Publication Data

US 2015/0314524 A1 Nov. 5, 2015

Related U.S. Application Data

(60) Provisional application No. 61/987,094, filed on May 1, 2014.

(51) Int. Cl.

| | |
|---|---|
| *B32B 37/00* | (2006.01) |
| *B29C 65/08* | (2006.01) |
| *B32B 27/34* | (2006.01) |
| *B29C 70/46* | (2006.01) |
| *B29C 65/00* | (2006.01) |
| *B29C 69/00* | (2006.01) |
| *B32B 7/04* | (2006.01) |
| *B32B 27/08* | (2006.01) |
| *B32B 27/20* | (2006.01) |

(Continued)

(52) U.S. Cl.
CPC ............ *B29C 65/086* (2013.01); *B29C 65/08* (2013.01); *B29C 66/1122* (2013.01); *B29C 66/21* (2013.01); *B29C 66/232* (2013.01); *B29C 66/43* (2013.01); *B29C 66/816* (2013.01); *B29C 66/8221* (2013.01); *B29C 66/8223* (2013.01); *B29C 66/83411* (2013.01); *B29C 69/00* (2013.01); *B29C 70/46* (2013.01); *B32B 7/045* (2013.01); *B32B 27/08* (2013.01); *B32B 27/20* (2013.01); *B32B 27/34* (2013.01); *B29C 66/71* (2013.01); *B29C 66/721* (2013.01); *B29C 66/92613* (2013.01); *B29K 2509/08* (2013.01); *B29L 2009/00* (2013.01); *B32B 2250/24* (2013.01); *B32B 2262/101* (2013.01); *Y10T 428/24826* (2015.01)

(58) Field of Classification Search
CPC ... B29C 65/08; B29C 65/086; B29C 66/1122; B29C 66/21; B29C 66/232; B29C 66/43; B29C 66/816; B29C 66/83411; B29C 69/00; B29C 70/46; B32B 7/045; B32B 27/08; B32B 27/20; B32B 27/34
USPC ........................................................ 156/73.1
See application file for complete search history.

(56) References Cited

U.S. PATENT DOCUMENTS 6,837,961 B2 * 1/2005 Malchow .......... A61F 13/15756
156/290

* cited by examiner

*Primary Examiner* — James D Sells
(74) *Attorney, Agent, or Firm* — Warn Partners, P.C.

(57) ABSTRACT

A process for manufacturing a sheet molding compound carrier film including a first layer of material and a second layer of material sealed with each other along an edge. The seal is formed using ultrasound transmitted by a weld horn as both layers of material move along an anvil portion. The seal on the edge is suitably formed to protect the edge and build a weld to ensure moldable sheet molding compound flows to the edges of the carrier sheet, while providing a homogeneous mixture of glass and resin and also allowing air to escape.

15 Claims, 5 Drawing Sheets

(51) Int. Cl.
*B29L 9/00* (2006.01)
*B29K 509/08* (2006.01)

ULTRASONIC EDGE SEALING OF SHEET MOLDING COMPOUND CARRIER FILM

CROSS-REFERENCE TO RELATED APPLICATIONS

This application claims the benefit of U.S. Provisional Application No. 61/987,094, filed May 1, 2014. The disclosure of the above application is incorporated herein by reference.

FIELD OF THE INVENTION

The present invention relates to an edge sealing system and process for forming a non-continuous weld between at least two layers of material, providing a seal allowing moldable sheet molding compound to flow to the seal and air to escape.

BACKGROUND OF THE INVENTION

Molding of various plastic materials is a common method used to create parts for various applications. One specific method of producing parts in this manner is through the use of a sheet molding compound (SMC). Several examples of thermoset composite molding are Sheet Molding Compound (SMC), Long Fiber Injection (LFI), Structural Reaction Injection Molding (SRIM), Reinforced Reaction Injection Molding (RRIM), or Vacuum Assisted Resin Transfer Molding (VARTM).

The method of making a part using LFI involves the use of fiberglass cut into long strands, or fibers, mixed with a resin to provide additional strength to a molded part. SRIM molding is similar to typical injection molding, except that thermosetting polymers are used, and the two parts of the polymer are mixed together and injected into a mold under high pressure, and are then allowed to cure. A reinforcing agent is used, such as glass fillers, in the mixture for improved strength. RRIM is another type of SRIM, in which a fiber mesh is used as the reinforcing agent; the fiber mesh is placed in the mold and the polymer mixture is then injection molded over it. VARTM is a process in which resin is inserted into a mold which contains layers of fibers or a preform; flow of resin is assisted by a vacuum in the mold.

Typical SMC sheet processing allows or results in several issues, including, a dry edge without needed characteristics or properties, a glass rich or resin rich mixture (e.g., not a homogeneous mixture of glass and resin in the SMC sheet), styrene release leading to unusable material, and wasted material on the edges of the SMC sheet.

There has been an increasing desire to create parts molded of one or more layers of SMC. Having layers of carrier film sealed on the edge of the sheet will reduce waste while more effectively producing SMC having suitable properties.

To try to overcome the issues described above, heat sealing edges of the carrier films has been employed. However, heat sealing has several disadvantages, for example, heat sensitivity, periodic replacement of heater belts, inconsistent burning of the film leading to over-seals, and the solid seal does not allow air to escape which traps air bubbles in the film.

Accordingly, there exists a need for a method of producing SMC carrier films by ultrasonic sealing the edges of the sheet which ensures moldable SMC flow to the edges to reduce waste, while allowing SMC material flow and homogeneous mixing.

SUMMARY OF THE INVENTION

The present invention is directed to an edge sealing system including providing a SMC carrier film or sheet made of at least a first layer of material and a second layer of material. The first and second layers are bonded or sealed with each other along an edge. The seal on the edge of the sheet is formed using ultrasound transmitted by a weld horn as both layers move in unison along a portion of an anvil. The seal on the edge is suitably formed to protect and build a dam to ensure moldable SMC flow to the edges of the sheet, while providing a homogeneous mixture of glass and resin and allowing air to escape.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In accordance with the present invention, a section of a sheet of material is made through the use of a sheet molding compound (SMC) carrier film process using an edge sealing system shown generally at 8. The edge sealing system 8 includes a weld anvil device generally shown at 10 and weld horn device generally shown at 12. Most preferably, the carrier film is formed of nylon films of a predetermined thickness. Generally, the SMC includes a resin and a reinforcing agent, most preferably, glass fillers. Alternatively, SMC materials consist of, but are not limited to, a thermoset material, a polymer (such as polyester or vinylester) resin, inert fillers, fiber reinforcement, carbon fibers, catalysts, pigments and stabilizers, release agents, and/or thickeners. SMC sheets can be formed to various shapes and have a predetermined thickness, depending upon the application and part that is to be created. By way of example, a part is made using SMC sheet(s) configured for insertion into a mold. For example, one or more SMC sheets may be formed to produce the bumper, door panel, running boards or other parts of an automobile, body panels for home appliances such as refrigerators or freezers, or the like.

Figure 5:
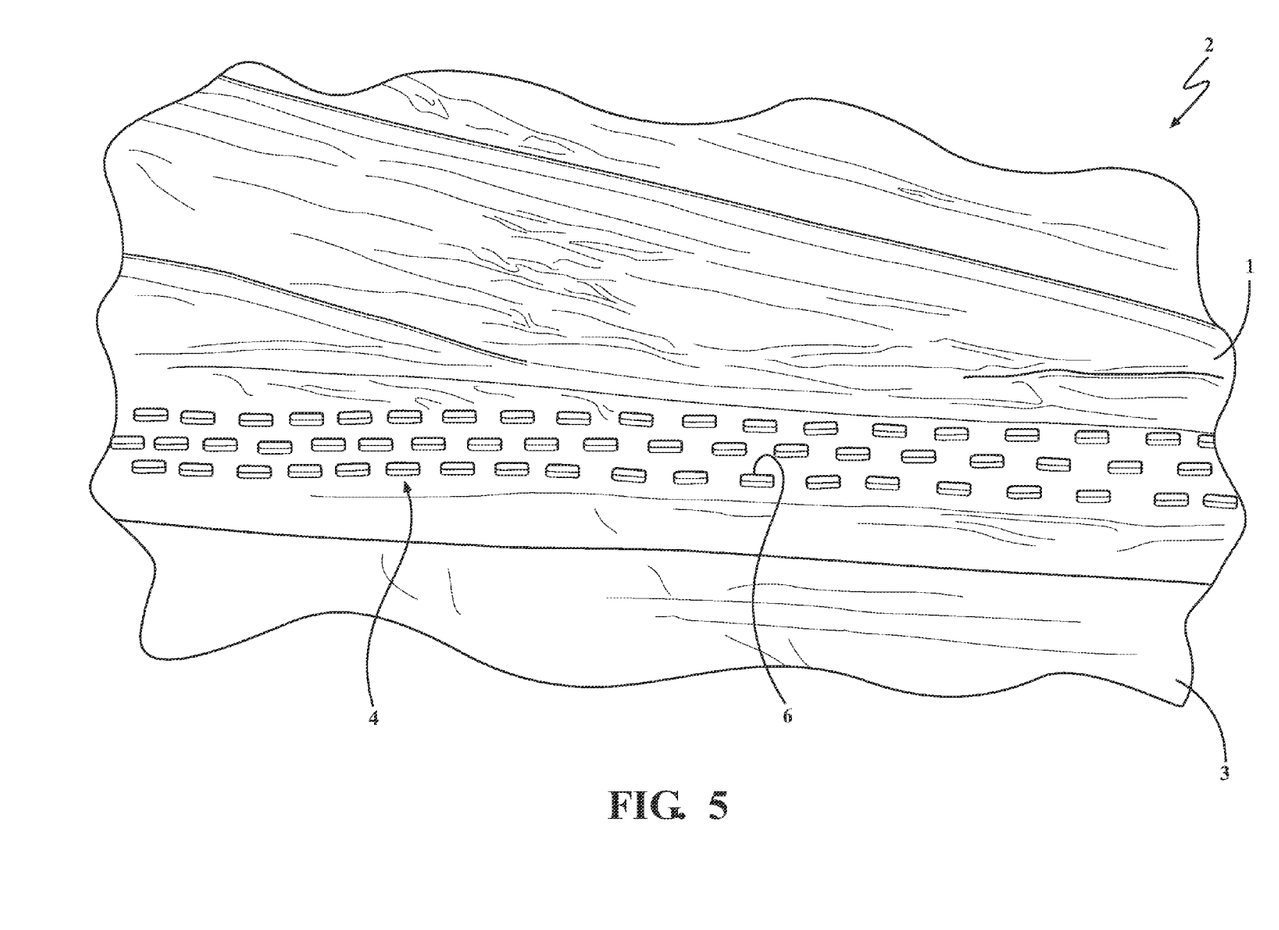
FIG. 5 is a top plan view of a sealed edge of a carrier film.

Referring to FIGS. 1-5 generally, the carrier film generally shown at 2 includes at least one first layer of material 1 and at least one second layer of material 3. Both the first and second layers, e.g., of nylon film, are sealed toward at least one edge of the sheet using the weld horn device 12 in cooperation with the weld anvil device 10 to protect the sheet and build a dam shown generally at 4 (FIG. 5). This ensures moldable SMC to the edges of the sheet thereby reducing waste. This is a significant benefit over typical processes.

The weld horn device 12 is provided with a horn portion shown generally at 14, (e.g., sonotrode) suitably configured to transfer sound waves at a predetermined frequency and duration to heat a predetermined specific area along the first layer of material 1 and the second layer of material 3 to seal the edges of the layers to one another thereby forming the sealed carrier film sheet 2. The horn portion 14 also applies a predetermined pressure during sealing in cooperation with an opposing pressure applied by the proximal location of the weld anvil device 10 with respect to the horn portion 14 with the film 2 passing therebetween.

The weld anvil device 10 includes an anvil portion indicated generally at 16 that is rotatably mounted. The horn portion 14 and anvil portion 16 are located a predetermined distance from one another operable for receiving the film therebetween. Most preferably, the clearance between the horn portion 14 and anvil portion 16 is about 0.0015 inches. The film, e.g., nylon film, fits between the horn portion 14 and the anvil portion 16 and the horn portion 14 supplies the sonic motion as the film is moving over the horn portion 14. At least one drive wheel shown generally at 18 is rotatably mounted to the weld anvil device 10 and used to further align the first and/or second layers of material 1, 3 and move the film linearly.

There is further provided at least one turnbuckle device shown generally at 20 operably mounted to the weld anvil device 10 that is selectively tightened or loosened to allow adjustability in predetermined clearance height with the horn portion 14 as well as access for maintenance. Preferably, the turnbuckle 20 is threaded on at least one end, preferably, on both ends and selectively tightened or loosened to allow the adjustability in clearance height to the horn portion 14.

During operation, the anvil portion 16 rotates continuously to move the film in a linear direction as the first layer of material 1 and the second layer of material 3 of the carrier film 2 are sonically welded together creating a seal 4 that serves as the dam. The dam additionally has the advantage of stopping the flow of reinforcing agent and ensuring a homogeneous mixture of the glass and resin. These are significant benefits over typical processes which lack homogeneous mixing or have glass rich or resin rich segments which reduces effectiveness of the SMC sheets and hinders molding to meet specifications.

In addition, the present invention will not burn the nylon plastic and will not cause an over seal. The "stitching type" of seal 4 that is created along the carrier film 2 edge is a non-continuous weld. Thus, there is provided suitably sized smaller apertures 6 at predetermined intervals in the weld that allow air to escape. Sealing the edges of the SMC carrier film 2 using ultrasound in combination with the stitched type non-continuous seal 4 allows air to escape thereby decreasing entrapped bubbles in the carrier film 2. This is a significant benefit over typical processes and solid seals which do not allow air to escape. Depending on the application, most preferably, the first layer of material 1 and at least one second layer of material 3 are the same material, alternatively, they are made of different materials. Depending on the application, other suitable materials are contemplated.

Figure 1:
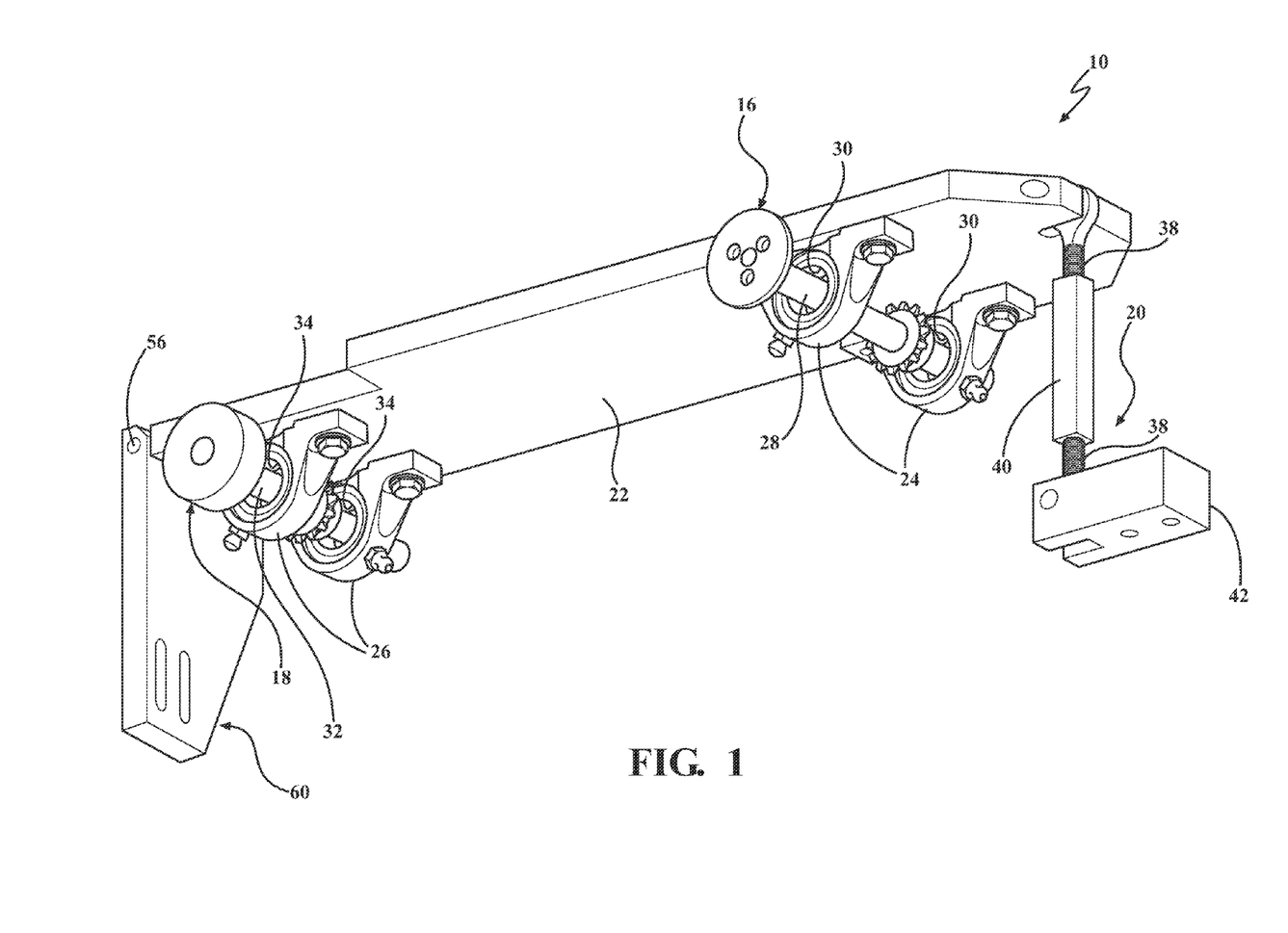
FIG. 1 is a perspective view of a weld anvil mount device, in accordance with the present invention.
Figure 3:
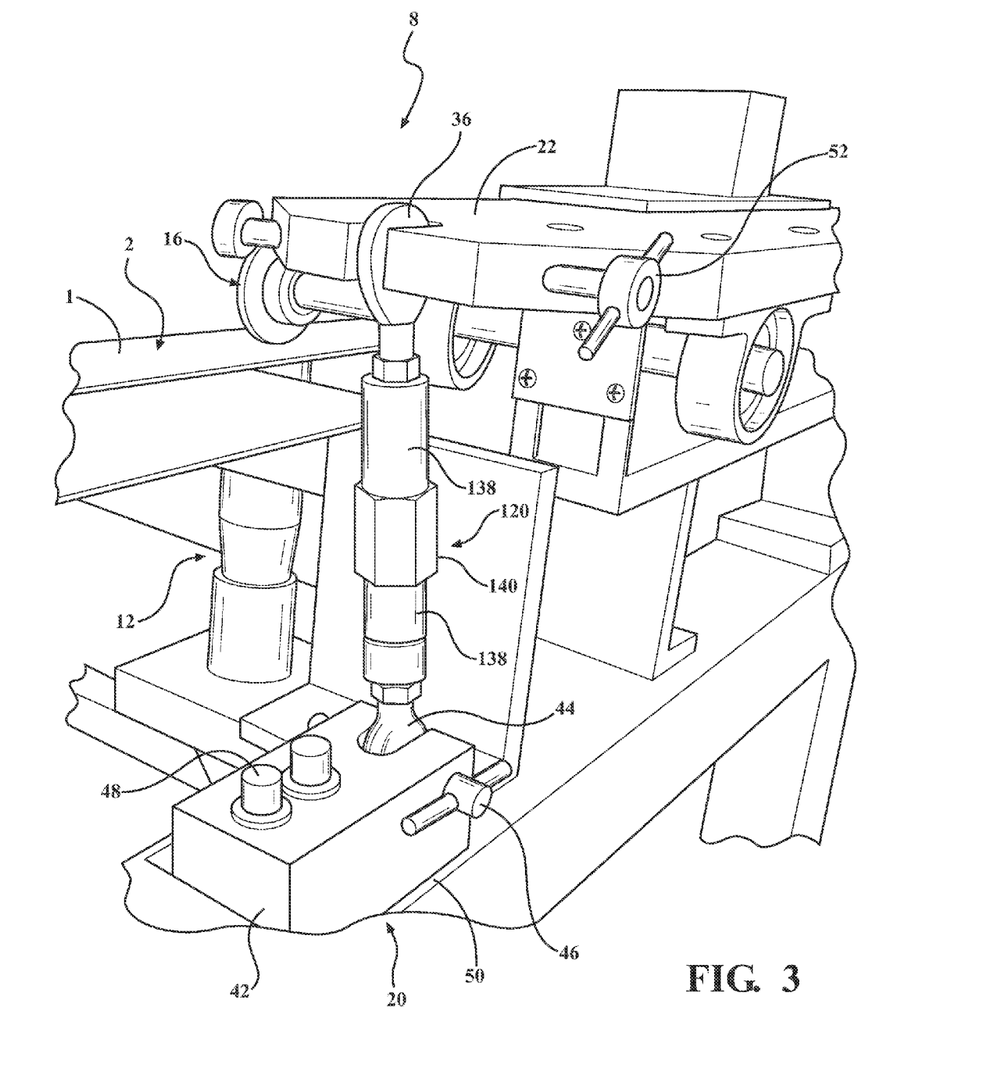
FIG. 3 is a perspective view of the weld anvil mount device and weld horn mount device of an edge sealing system with film in a welding zone, in accordance with the present invention.
Figure 4:
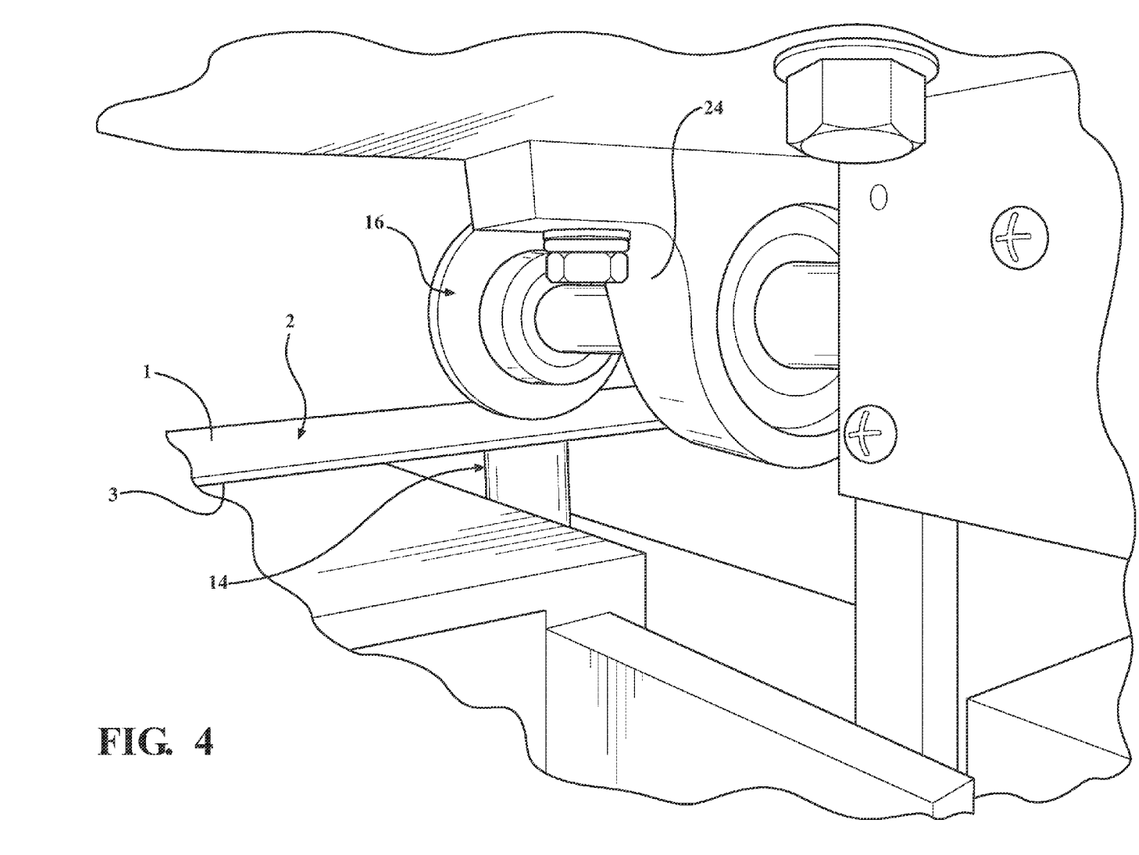
FIG. 4 is an enlarged perspective view of the welding zone of FIG. 3 depicting the weld anvil mount device and the weld horn mount device in the installed position, in accordance with the present invention.

Referring to the figures generally, and more particularly to FIGS. 1 and 3, the weld anvil device 10 is provided with a mounting plate portion or mounting plate 22 to connect the anvil portion 16 and drive wheel portion 18 to the device 10 at a predetermined distance apart. There is provided first and second pair of mounting features or brackets 24, 26, respectively, that are connected to the underside of the mounting plate 22 using fasteners. At least one first shaft 28 and at least one second shaft 32 are operably driven to rotate the anvil portion 16 and drive wheel 18, respectively. The first shaft 28, e.g., drive shaft, extending through aligned openings 30 in the first pair of mounting features 24 is operably connected at one end to the anvil portion 16. The second shaft 32, e.g., drive shaft, extending through aligned openings 34 in the second pair of mounting features 26 is operably connected at one end to the drive wheel portion 18.

The turnbuckle device 20 is provided with an eye portion 36 that has an eye hole for rotatably connecting to the mounting plate 22 near the anvil portion 16, preferably, to the end of the mounting plate 22. At least one threaded portion 38 is provided, most preferably, a threaded portion 38 is provided on each end of a threaded body portion 40 or "turnbuckle" such that the turnbuckle is rotatable to selectively extend/reduce length of the device 20. A base portion 42 is operably connected, most preferably by a second eye portion 44, to the lower threaded portion 38 for bracing against a fixed surface on the sheet molding compound machine. The threaded portions 38, 38 can, alternatively, be provided on a single threaded screw extending through the turnbuckle.

In a preferred embodiment, a first pin 46 is located through the base portion 42 and through the second eye portion 44 such that pulling the first pin 46 out of the eye portion 44 allows an operator to rotate the turnbuckle to selectively raise up or lower the mounting plate 22. Once the turnbuckle is rotated a desired amount, the first pin 46 is then reinserted through the base 42 and second eyelet 46. The turnbuckle device 20 is thereby held in its desired adjusted position. Optionally, fasteners 48, e.g., bolts, are provided to allow additional securement of the base portion 42 to the fixed surface 50 of the sheet molding compound machine. A second pin 48 is provided through the mounting plate 22 and first eye portion 36 connecting the eye portion 36 within a recess of the mounting plate 22. This second pin 48 is also removable to allow selective rotation of the turnbuckle 40 for adjustability with respect to the horn portion 16 location.

An alternative embodiment of the turnbuckle device 120 is shown in FIG. 3, with like numbers referring to like elements. In this embodiment, the turnbuckle device 120 has a body portion 140 or "turnbuckle" that is a hexagonal shaped body for easier gripping by hand or wrench. The turnbuckle 140 has internal threads. The threaded portions 138, 138 are housed in sleeves. However, the operation of the turnbuckle device 120 is substantially similar to the embodiment shown in FIG. 1.

Referring to the Figures generally, and more particularly to FIG. 1, the weld anvil device 10 is also provided with at least one hinged backing plate 60 connected to the mounting plate 22 on the end opposite to the turnbuckle device 42. The hinged backing plate 60 operably couples the weld anvil device 10 to a predetermined location on the sheet molding compound machine 50, e.g., via fasteners or suitable locking/interlocking mechanism engaging obround apertures. The backing plate 60 is hinged to allow the weld anvil device 10 to be rotated into predetermined operating position (FIGS. 1, 3) or rotated into its predetermined resting (non-operating) position for cleaning or when sealing is not needed. The backing plate 60 and mounting plate portion 22 are adapted for attachment of the hinge 56 which can be any hinge arrangement suitable for predetermined strength and durability requirements. Typically, cooperating hinge features are built into the upper edge of the backing plate 60 and edge of the mounting plate 22 and fastened in the region, e.g., directly or by way of a fastener or pin going through diverging side walls of hinge features. FIG. 1 depicts a hinge pin 56, however, depending on the application hinges are bolted, screwed, welded, riveted, secured with adhesive and/or epoxy, molded-in plate 60, 22 features, or combinations thereof or otherwise hinged to rotate the backing plate 60 up/down depending on the application.

Figure 2:
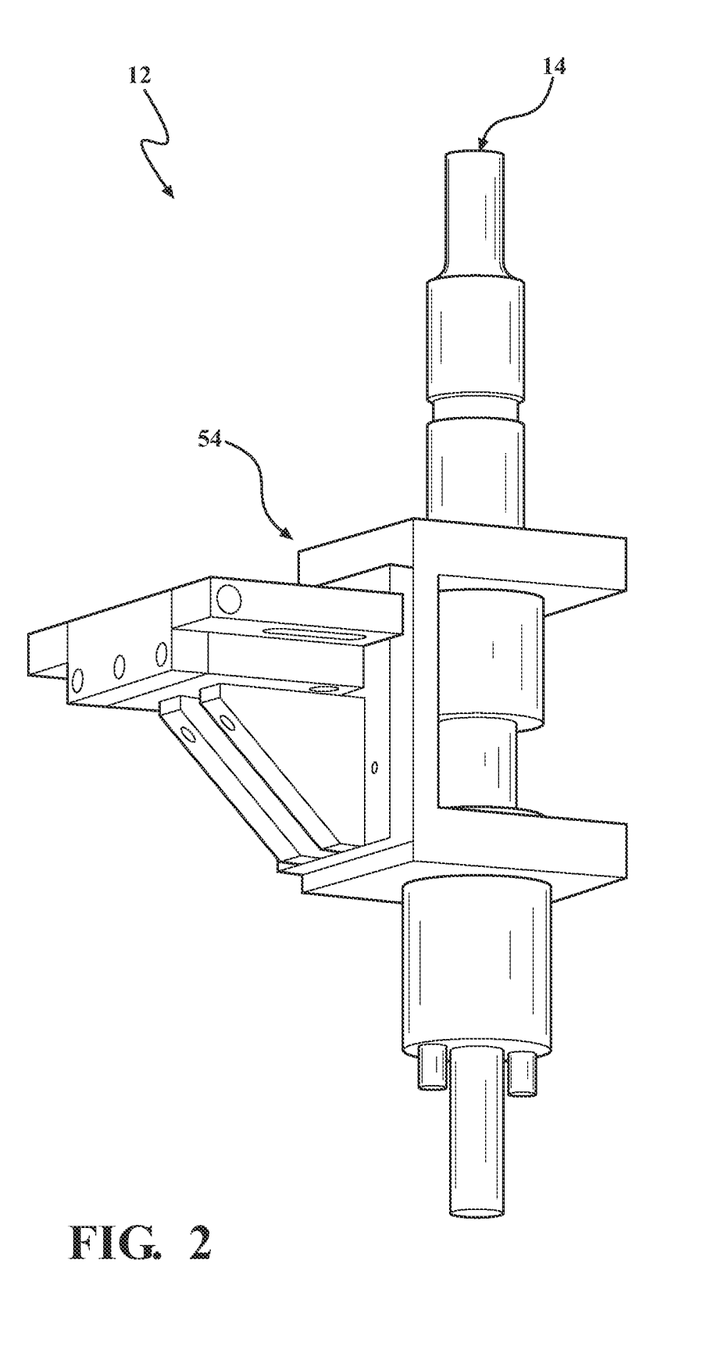
FIG. 2 is a perspective view of a weld horn mount device, in accordance with the present invention.

Referring to the Figures generally, and more particularly to FIG. 2, the weld horn device 12 is provided with at least one mounting portion generally indicated at 54 for operably connecting the device 12, e.g., with fasteners such as bolts, to the sheet molding compound machine such that the horn portion 14 is adjacent to the anvil portion 16 as described previously.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making a multi-layer carrier film for a sheet molding compound, comprising the steps of:
   providing at least a first layer of material;
   providing at least a second layer of material;
   providing a weld anvil device having an anvil portion that is rotatable;
   providing a weld horn device having a horn portion located adjacent to said anvil portion, where said weld horn device provides a predetermined ultrasonic frequency;
   placing an edge area of said first layer and said second layer of materials between said horn portion and said anvil portion;
   applying said ultrasonic frequency while moving said first and second layers in a linear direction to vibratingly press said edge areas of said first layer and said second layer together forming a seal along at least one edge of said carrier film creating a dam to stop the flow of a sheet molding compound and to ensure a homogeneous mixture of said sheet molding compound.

2. The method for making a multi-layer carrier film for a sheet molding compound of claim 1, wherein said seal is a non-continuous weld suitably configured to allow air to escape.

3. The method for making a multi-layer carrier film for a sheet molding compound of claim 2, wherein said non-continuous weld is formed of a plurality of rows of stitches.

4. The method for making a multi-layer carrier film for a sheet molding compound of claim 1, further comprising providing said sheet molding compound between said first and second layers of material, where said sheet molding compound comprises at least one resin and at least one reinforcing agent.

5. The method for making a multi-layer carrier film for a sheet molding compound of claim 4, wherein said at least one reinforcing agent is a glass filler.

6. The method for making a multi-layer carrier film for a sheet molding compound of claim 1, wherein said first layer and second layers of material are nylon film.

7. The method for making a multi-layer carrier film for a sheet molding compound of claim 1, wherein the distance between said horn device and anvil device is about 0.0015 inches.

8. The method for making a multi-layer carrier film for a sheet molding compound of claim 1, wherein said weld anvil device further comprises,
   a mounting plate portion;
   a first shaft coupled to said anvil portion and rotatably coupled to a first pair of mounting brackets, said mounting brackets connected to said mounting plate portion;
   at least one drive wheel;
   a second shaft coupled to said drive wheel and rotatably coupled to a second pair of mounting brackets, said second pair of mounting brackets connected to said mounting plate portion;
   wherein as said horn portion supplies sonic motion, said drive wheel and anvil portion rotate to move the film linearly over the horn portion as said first and second layers of material of the carrier film are sonically welded together to create said seal.

9. The method for making a multi-layer carrier film for a sheet molding compound of claim 1, wherein said weld anvil device further comprises a turnbuckle device mounted near said anvil portion, said turnbuckle device having a body portion that is internally threaded and receives at least one threaded portion for adjusting the height of said anvil portion with respect to the terminal end of said horn portion.

10. The method for making a multi-layer carrier film for a sheet molding compound of claim 1, further comprising providing a backing plate operably hinged to said weld anvil device, wherein said hinged backing plate allows said weld anvil device to be selectively rotated between an operating position for sealing and a resting position when sealing is not desired.

11. A method for making a sheet molding compound for manufacturing a component, comprising the steps of:
   providing a first layer of material made of nylon film;
   providing a second layer of material made of nylon film;
   providing a weld anvil device having an anvil portion that is rotatable;
   providing a weld horn device having a horn portion located a predetermined distance from said anvil portion, where said weld horn device provides a predetermined ultrasonic frequency;
   placing an edge of said first layer and said second layer between said horn portion and said anvil portion;
   applying said ultrasonic frequency while moving said first and second layers together in a linear direction to vibratingly press said edge areas of said first layer and said second layer together forming a seal along said carrier film, wherein said seal is a non-continuous weld;
   inserting a moldable material between said first and second layers of material, wherein said seal allows moldable material flow to the edges of the sheet while providing a homogeneous mixture of reinforcing agent and resin and allowing air to escape; and
   curing said moldable material between said first and second layers of material forming said sheet molding compound.

12. The method of claim 11, wherein said non-continuous weld is formed of a plurality of rows of stitches.

13. The method of claim 11, wherein said reinforcing agent is a glass filler.

14. The method of claim 11, wherein said first layer and second layers of material are nylon film.

15. The method of claim 11, wherein said weld anvil device further comprises,
- a mounting plate portion;
- a turnbuckle device connected to the mounting plate portion, said turnbuckle device having a body portion that is internally threaded and receives at least one threaded portion for adjusting the height of said anvil portion with respect to the terminal end of said horn portion;
- a first shaft coupled to said anvil portion and rotatably coupled to a first pair of mounting brackets, said mounting brackets connected to said mounting plate portion;
- at least one drive wheel;
- a second shaft coupled to said drive wheel and rotatably coupled to a second pair of mounting brackets, said second pair of mounting brackets connected to said mounting plate portion;
- wherein as said horn portion supplies sonic motion, said drive wheel and anvil portion rotate to move the film linearly over the horn portion as said first and second layers of material of the carrier film are sonically welded together to create said seal.

* * * * *